(12) United States Patent
Rao et al.

(10) Patent No.: US 11,335,331 B2
(45) Date of Patent: May 17, 2022

(54) MULTIBEAM KEYWORD DETECTION SYSTEM AND METHOD

(71) Applicant: Knowles Electronics, LLC, Itasca, IL (US)

(72) Inventors: Harsha Rao, Itasca, IL (US); Malakapati Loka Nagendra Prasad, Karnataka (IN); Hindupur Keerthi Sagar, Karnataka (IN); Pratik Shah, Itasca, IL (US); Murali Mohan Deshpande, Karnataka (IN); John Woodruff, Mountain View, CA (US); Sai Ravi Teja Pulugurtha, Itasca, IL (US); Rohit Paturi, Itasca, IL (US)

(73) Assignee: KNOWLES ELECTRONICS, LLC., Itasca, IL (US)

( * ) Notice: Subject to any disclaimer, the term of this patent is extended or adjusted under 35 U.S.C. 154(b) by 0 days.

(21) Appl. No.: 16/938,428

(22) Filed: Jul. 24, 2020

(65) Prior Publication Data

US 2021/0065686 A1    Mar. 4, 2021

Related U.S. Application Data

(60) Provisional application No. 62/879,164, filed on Jul. 26, 2019.

(51) Int. Cl.
| | | |
|---|---|---|
| *G10L 15/08* | (2006.01) | |
| *H04R 1/40* | (2006.01) | |
| *H04R 3/00* | (2006.01) | |
| *G10L 15/22* | (2006.01) | |
| *G10L 21/0232* | (2013.01) | |
| *G10L 21/0216* | (2013.01) | |
| *G10L 21/0208* | (2013.01) | |

(52) U.S. Cl.
CPC .............. *G10L 15/08* (2013.01); *G10L 15/22* (2013.01); *G10L 21/0232* (2013.01); *H04R 1/406* (2013.01); *H04R 3/005* (2013.01); *G10L 2015/088* (2013.01); *G10L 2021/02082* (2013.01); *G10L 2021/02166* (2013.01)

(58) Field of Classification Search
CPC ..... G10L 15/08; G10L 15/22; G10L 21/0232; G10L 21/0216; G10L 2021/02166; G10L 2021/02082; G10L 2015/088; H04R 1/406; H04R 3/005; H04R 2201/401; H04R 2430/23
See application file for complete search history.

(56) References Cited

U.S. PATENT DOCUMENTS

| | | |
|---|---|---|
| 9,633,655 B1 | 4/2017 | Santos et al. |
| 9,668,048 B2 | 5/2017 | Sakri et al. |
| 9,772,815 B1 | 9/2017 | Medina |
| 9,953,634 B1 | 4/2018 | Pearce et al. |
| 10,045,140 B2 | 8/2018 | Rossum et al. |

(Continued)

FOREIGN PATENT DOCUMENTS

CN    108564951 A  *  9/2018

*Primary Examiner* — Yogeshkumar Patel
(74) *Attorney, Agent, or Firm* — Foley & Lardner LLP

(57) ABSTRACT

A system and method provides for multibeam keyword detection. A composite audio signal may include sound components. The system and method groups the sound components into subsets based on the angles of arrival of sound components. Keyword detectors evaluate each subset and determine whether a keyword is present.

20 Claims, 5 Drawing Sheets

(56) References Cited

U.S. PATENT DOCUMENTS

| | | |
|---|---|---|
| 10,304,475 B1 * | 5/2019 | Wang .................. G01S 3/80 |
| 10,455,325 B2 | 10/2019 | Woodruff et al. |
| 2014/0025379 A1 * | 1/2014 | Ganapathiraju ........ G10L 15/08 |
| | | 704/255 |
| 2016/0189220 A1 | 6/2016 | Verma |
| 2016/0196838 A1 | 7/2016 | Rossum et al. |
| 2016/0227336 A1 | 8/2016 | Sakri et al. |
| 2017/0206898 A1 | 7/2017 | Bernard et al. |
| 2018/0061396 A1 | 3/2018 | Srinivasan et al. |
| 2018/0144740 A1 | 5/2018 | Laroche et al. |
| 2018/0174574 A1 | 6/2018 | Laroche |
| 2018/0332416 A1 | 11/2018 | Rossum et al. |
| 2019/0208317 A1 | 7/2019 | Woodruff et al. |
| 2019/0222691 A1 | 7/2019 | Shah et al. |
| 2020/0202843 A1 | 6/2020 | Shah |

* cited by examiner

MULTIBEAM KEYWORD DETECTION SYSTEM AND METHOD

CROSS-REFERENCE TO RELATED APPLICATIONS

This application claims the benefit of and priority to U.S. Provisional Patent Application No. 62/879,164, filed Jul. 26, 2019, the entire contents of which are incorporated herein by reference.

TECHNICAL FIELD

This application relates generally to audio processing and more particularly to systems and methods for multibeam keyword detection.

BACKGROUND

A voice controlled user interface of a communication or other audio device may activate in response to a user speaking a keyword and may accept spoken commands after activation. However, the user may utilize the voice controlled user interface in a variety of different environments, including contexts with background sounds such as reproduced voices, other speaking individuals, two-way communications devices, and other sources of potential sound and/or spoken word sounds apart from the user. There remain challenges associated with distinguishing sounds associated with voice control inputs of a user from other sounds such as speaking third parties, reproduced sounds, and/or background noise.

Prior efforts to address these challenges include applying increasingly strict rules associated with the detection of spoken keywords in order to limit the incidence of a false positive detection of a keyword. However, such efforts to improve the false alarm (FA) rate of a device also harms the true positive (TP) activation rate of the device by overlooking spoken keywords that fail to comply with such increasingly strict detection rules. Moreover, prior efforts fail to address the problem of detection of a spoken keyword followed by detection of other environmental sounds after detection of the keyword and the false association of these environmental sounds with the keyword (or with a spoken command). Thus, there remains a need to distinguish valid user input from other sounds while more effectively balancing the need to minimize the false alarm rate without excessively harming the true positive (TP) activation rate of the device.

BRIEF DESCRIPTION OF THE DRAWINGS

For a more complete understanding of the disclosure, reference should be made to the following detailed description and accompanying drawings wherein.

SUMMARY

Figure 1:
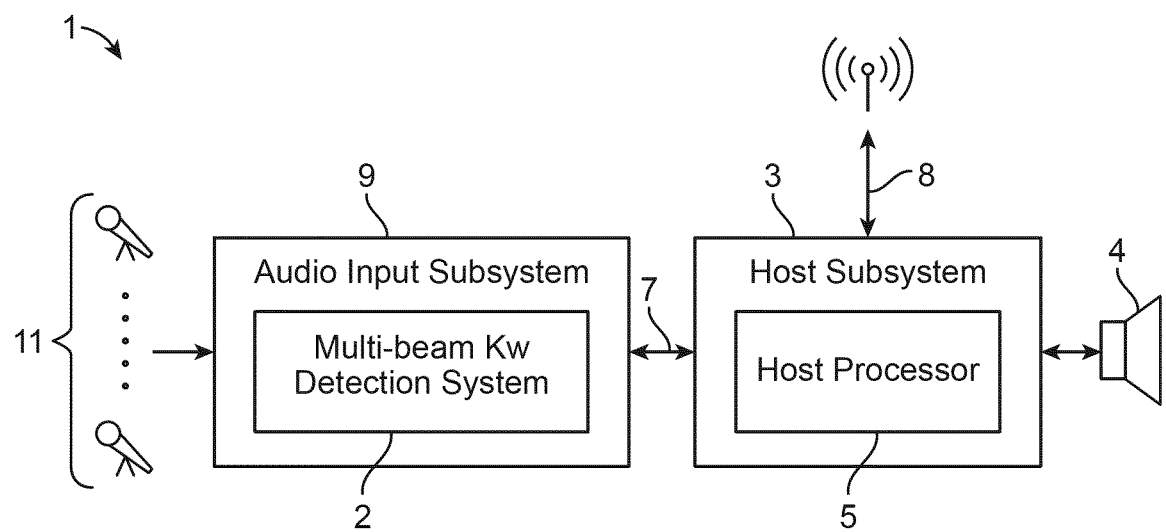
FIG. 1 depicts an example smart speaker including a an audio input subsystem with a multibeam keyword detection system therein, in accordance with various embodiments.

According to certain general aspects, a system and method provides for multibeam keyword detection. A composite audio signal may include sound components. The system and method groups the sound components into subsets based on the angles of arrival of sound components. Keyword detectors evaluate each subset and determine whether a keyword is present.

In one or more embodiments, a system for keyword detection comprises an audio input configured to receive a composite audio signal from a microphone array, a beamforming engine comprising a plurality of beamformers coupled to receive the composite audio signal and configured to form a plurality of beam signals from the composite audio signal, each of the beam signals having an associated beam angle and comprising audio data corresponding to sounds captured by the microphone array within a range of angles of arrival with respect to the beam angle, a keyword detection module having a plurality of keyword detectors, each keyword detector configured to receive a respective one of the plurality of beam signals, and a multibeam detection engine coupled to receive keyword presence data from all of the plurality of keyword detectors and configured to produce a keyword detection output indicating whether or not a keyword has been detected based on the received keyword presence data.

In these and other embodiments, a method of keyword detection comprises receiving from a microphone array a composite audio signal, forming a plurality of beam signals from the composite audio signal, each of the beam signals having an associated beam angle and comprising audio data corresponding to sounds captured by the microphone array within a range of angles of arrival with respect to the beam angle, processing, by a plurality of keyword detectors, the plurality of beam signals to detect a keyword in the plurality of beam signals, each keyword detector configured to receive a respective one of the plurality of beam signals, and processing keyword presence data from all of the plurality of keyword detectors to produce a keyword detection output indicating whether or not a keyword has been detected based on the keyword presence data.

DETAILED DESCRIPTION

Skilled artisans will appreciate that elements in the figures are illustrated for simplicity and clarity. It will further be appreciated that certain actions, blocks, and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

According to certain general aspects, the present embodiments are directed to systems and methods for multibeam keyword detection. A multibeam keyword detection system may be implemented to improve the accurate detection of spoken keywords. The multibeam keyword detection system may be implemented in audio input subsystem operable to perform voice authentication, or voice recognition, or voice to text conversion, or any generic voice recognition implementation as desired. The system enhances the avoidance of false activation events (also called, false alarm events) and improves the intelligibility of detected speech. In various embodiments, a multibeam keyword detection system may transmit an activation instruction to a host subsystem, in response to receipt of a spoken keyword. The host subsystem may then process a spoken command received by the system following the keyword. However, in some environments, noise or speech of third parties originating from a different source of sound than the spoken keyword may cause false alarm events. In such instances, the multibeam keyword detection system and method distinguishes between the user providing the spoken command and/or keyword and noise or third party speech, and thus may refrain from transmitting the activation instruction to the host subsystem in recognition of the false alarm. Moreover, the multibeam keyword detection system improves the ability to detect desired keywords in noisy environments where a challenging signal-to-noise ratio may otherwise hamper user efforts to trigger an activation event or may otherwise hamper machine recognition of spoken commands. Keyword detection may be user independent ("user independent"). Keyword detection may also be trained to specific users so that imposters may be ignored ("user dependent"). It should be appreciated that, although the embodiments will be described herein with reference to an example implementation in a smart speaker, many other implementations are possible in many other applications where spoken keywords or commands are processed by an audio system having a microphone array and/or multiple audio input beams.

Thus, in either a user independent or a user dependent implementation or in yet further implementations, a multibeam keyword detection system generally may enhance the reliability of keyword detections by diminishing the deleterious effects of noise or third-party speech and may further improve the reliability of command interpretation following the detection of a keyword by also diminishing the deleterious effects of noise or third party speech on machine language recognition.

In one aspect, beamforming technology is included in the multibeam keyword detection system. In various non-limiting embodiments, beamforming using multiple microphones serves as a front-end processing technique to improve speech comprehension and intelligibility for human communication channels (e.g., speakerphones) and for voice controlled machine systems with a keyword detector. Beamforming improves the true positive rate (TPR) of a keyword detection event and also reduces the word error rate (WER) for speech recognition systems that interpret voice commands provided after or in lieu of a keyword.

As provided herein, a multibeam keyword detection system both enhances keyword detection (e.g., device wakeup) and also accuracy of machine processing of voice commands. Sounds arriving at the microphones are converted to electronic signals or data. Angles of arrival may be determined for and/or associated with the sounds. Sets of sounds may be selectively ignored based on the angle of arrival. Moreover, sounds or sets of sounds may be selectively processed independently in groups termed "beams" or "beam signals". The groups may be chosen based on the angle of arrival of the sound or sets of sounds, so that the noise components in the sounds or sets of sounds are at least partially isolated so that the noise in one group does not deleteriously effect keywords or other spoken commands in another group, since the groups are divided based on the angle of arrival of the sounds or sets of sounds making up the groups.

Keyword detectors may be employed to determine whether a particular spoken word or phrase is present in the sounds or sets of sounds. Multiple keyword detectors may be provided and the different keyword detectors may process the different groups so that different sounds or sets of sounds are processed by different keyword detectors of the device having the multibeam keyword detection system. Keyword detectors may be physical devices and/or logical/software instances and may be implemented by known techniques to indicate keyword detection and/or provide a probability of whether a detection is valid or a false alarm.

Thus, a beamformer array may receive a composite signal with many sounds having many angles of arrival and individual beamformers of the beamformer array may output different beam signals including only the sounds arriving within the angle of arrival for that beam signal. The individual beamformers may divide the composite input signal into respective beams, each beam associated with a different angle of arrival range. The beamformers may operate in different modes as well. For instance, the beamformers may steer some or all of the beams, so that a user is maintained within a same beam while moving about an area. The beamformers may create dynamic beams, so that the width and direction of the beams changes based on changes in the constellation of sounds being received, and the beamformers may be configured to have static beams, such as for a system with limited processing power. The beamformers may change mode from time to time, in response to electronic instructions and/or detected changes in the constellation of sounds being received. Each beamformer may operate in the same mode, or in further instances, multiple beamformers operate in multiple modes. Furthermore, each beamformer may be associated with a single unique beam. The single unique beam may overlap one or more adjacent beam. In further instances, each beamformer may be associated with multiple unique beams, or may be associated with multiple overlapping beams.

As mentioned, by dividing the incoming sounds into sets (beams) based on the angle of arrival, noise associated with each beam can be isolated to that beam. In one example, if a loud vacuum cleaner is creating noise on a northward (zero degree) side of a device having the multibeam keyword detection system, and a user is speaking a keyword on a southward (180 degree) side of the device, the division of the sounds into different beams based on their angle of arrival permits the isolation of the vacuum cleaner noise from the keyword so that the signal-to-noise ratio of the beam including the keyword can be improved and the keyword and/or subsequent voice commands more accurately processed. Similarly, the beam comprising the vacuum cleaner noise can be discarded (e.g., ignored). The division of the sounds into different beams based on their angle of arrival can be performed by different beamformers forming the angular boundaries of each beam. Moreover, the different beamformers may feed data to different keyword detectors. Consequently, parallel processing is facilitated where a beamformer may be feeding a keyword detector data corresponding to one beam so that the keyword detector is evaluating that beam for keywords, while at a same time a different beamformer may be feeding a different keyword detector data corresponding to a different beam so that the different keyword detector is evaluating that different beam for keywords. Because the beams are isolated by different beamformers, the noise components of each do not add together, and consequently, the signal-to-noise ratio at both keyword detectors is enhanced.

Moreover, the operating parameters of the multibeam keyword detection system may change. For example, in a first instance, beamformers may be selectively turned on or off, and the angles of arrival associated with a given beamformer may be changed so that adaptive cancelation of noise sources, or adaptive steering of a beam formed toward a user issuing keywords or commands may be provided. An API may permit configuration of the number of beams, direction of beams, width of the beams and other aspects, as desired. As used herein, the phrase "steering a beam" means to accept only those sounds arriving with an angle of arrival inside a range of angles less than 360 degrees, which range of angles may be changed—for instance the median angle of the range of angles may be varied as a speaker moves or as a noise environment changes. Similarly, the boundaries of the range of angles may be changed as a noise environment changes. By "forming" a beam that accepts sounds originating from a speaker but rejects at least a portion of other sounds originating at different angles outside the range of angles, sounds coming from sources other than the speaker can be ignored. Furthermore, by steering multiple beams, omnidirectional performance may be obtained, yet noise may be limited to only certain beams, leaving other beams without the deleterious effects of said noise.

Notably, prior efforts to provide improved keyword detection accuracy and precision are hampered by poor performance when angle of arrival information provided by the microphones is inaccurate or is imprecise. One prior solution is to provide a camera to visually identify a user and steer a beam toward the user. However, cost, complexity, and privacy concerns hamper use of cameras. In further prior efforts, inaccurate or imprecise angle of arrival information occurs in highly reverberant environments. Prior responses include increasing the width of the beam or operating in an omnidirectional mode, however such responses also leak more noise because the beam, being very wide, accepts more unwanted sound waves arriving from a greater variety of angles, thereby diminishing the signal-to-noise ratio. In contrast, and as disclosed herein, multiple beamformers of narrower beams may isolate noise but still facilitate selective omnidirectional operation. This overcomes the long-felt need for addressing the problem of poor angle of arrival information by grouping arriving sounds into collections based on angle of arrival rather than mandating precise or continuous measurement of an exact angle of arrival of an individual sound. For instance, four beamformers with a 90-degree beam provide 360-degree coverage but isolate noise into 90 degree segments, so that the signal-to-noise ratio of desired sounds (keywords or voice commands) is improved for all users regardless of their location relative to the device. In further embodiments, the beamformers may have greater beams wide enough to overlap with adjacent beamformers. Moreover, multiple beamformers may operate in concert to improve identification of false detection events, in addition to the amelioration of noise previously discussed.

As mentioned, the provided system may improve recognition of when an activation event is false. For instance, a keyword may, from time to time, be detected in error. The provided system recognizes these erroneous activations and flags them so that detection algorithms can be trained. The provided system includes multiple keyword detectors, each associated with a different beamformer, so that if one or more keyword detector detects a keyword at a time near to the time another keyword detector had a false alarm, then the provided system may ignore that detected keyword because the keyword detection event is likely to also be a false alarm event. In this manner, the total number of false alarm events may be reduced because one such an event, when recognized, may trigger the inhibition of other such events for a temporally proximate period of time. In addition, because multiple beamformers may operate in concert with overlapping beams, a system may ignore keywords detected only by a single beamformer rather than multiple, or may ignore keywords detected for a brief instant inconsistent with the duration of human speech, and or the like.

Having discussed aspects of the system and method and advantages of the same, attention is now directed to the figures for a discussion of example embodiments implementing the system and method. Referring to FIG. 1, a voice assistance device (e.g. smart speaker) 1 is shown. The smart speaker 1 may have an audio input subsystem 9 with a multibeam keyword detection system 2 that provides data representing detected keywords to a host subsystem 3 of the smart speaker 1.

In various embodiments, the smart speaker 1 may have a speaker 4 and one or more microphones (e.g., microphone array 11). The audio input subsystem 9, and specifically, the number of beams, direction of beams, and width of beams as will be described in more detail below may be configured via interface 7 by host subsystem 3 (e.g. API software or firmware executed by the host subsystem) Also, in this manner, different configurations of hardware are contemplated. The speaker 4 may reproduce sound for a user to hear. The microphone(s) 11 may receive sound produced by the user and other sound sources for electronic processing and/or transmission to other devices or components. For example, the audio input subsystem 9 may be used for voice control of appliances and/or voice communication between individuals.

The smart speaker 1 may have a host subsystem 3, as mentioned. The host subsystem 3 may comprise a computer, processor(s) or other electronic device as desired. The host subsystem 3 includes one or more wired or wireless communication channels 8 (e.g. WiFi, Bluetooth, etc.) to communicate with other devices remotely located from the host subsystem 3 or to receive music or spoken word content. For instance, the host subsystem 3 may communicate with a user's mobile device to allow a user to have an audio or video call with another person far away via the mobile device and smart speaker 1. The host subsystem 3 thus may receive an audio input and may provide an audio output so that a user may both speak and listen using smart speaker 1. The host subsystem 3 may include a host processor 5 that communicates via an interface 7 with an audio input subsystem 9 providing at least one of the audio input and the audio output functionality.

Audio input subsystem 9 may communicate with microphone array 11 of smart speaker 1 to receive and process speech from a user to control a voice activated user interface of smart speaker 1. However, the microphone(s) may also detect sounds from surrounding sources other than the user. These challenges are also present when the microphone detects sounds generated by the speaker of the audio input subsystem 9, by other nearby devices, and/or by other nearby people. A multibeam keyword detection system 2 is thus incorporated into the audio input subsystem 9 to address this challenge. For instance, the audio input subsystem 9 having the multibeam keyword detection system 2 may send a keyword detection signal via interface 7 to host subsystem 3 so that host processor 5 of the host subsystem 3 takes a responsive action when a user speaks a keyword that controls a function of the smart speaker 1. The multibeam keyword detection system 2 may also may inhibit the transmission of a keyword detection signal to the interface 7 when the detection of a keyword is a false alarm not from the user. The multibeam keyword detection system 2 may also diminish the likelihood of missed or misidentified keywords or other voice commands by providing noise isolation so that noise originating at angles associated with a first beamformer is not mixed with keywords originating at angles associated with a second beamformer, but are isolated from the second beamformer.

In one non-limiting embodiment shown in FIG. 1 and briefly discussed above, the voice assistance device may comprise a smart speaker 1. However, voice assistance device may alternatively comprise a smartphone, a laptop, a tablet, or another electronic device. The host processor 5 of the host subsystem 3 may comprise a software application and/or a processor executing software/firmware instructions from a memory. The host processor 5 may communicate via the interface 7 (e.g. a communication channel or bus) with the audio input subsystem 9. The audio input subsystem 9 may comprise a processor such as an ASIC and/or a DSP. The multibeam keyword detection system 2 may be implemented by the processor and associated firmware of audio input subsystem 9. Thus one may appreciate that a host subsystem 3 may wait to receive a keyword or other voice command. The audio input subsystem 9 may cause a state transition of the host subsystem 3 when a keyword is received and/or a keyword and subsequent command is received. For instance, the host subsystem 3 may awaken and may respond to the subsequent command upon receipt of a keyword. The audio input subsystem 9 communicates with the host subsystem 3 via a signal sent via interface 7 from the multibeam keyword detection system 2. For instance, smart speaker 1 may enter a sleep state until the audio input subsystem causes the device to awaken from the sleep state. The audio input subsystem 9 may cause this awakening in response to a detection event associated with the multibeam keyword detection system 2, such as detection of a spoken keyword uttered by a user.

Figure 2:
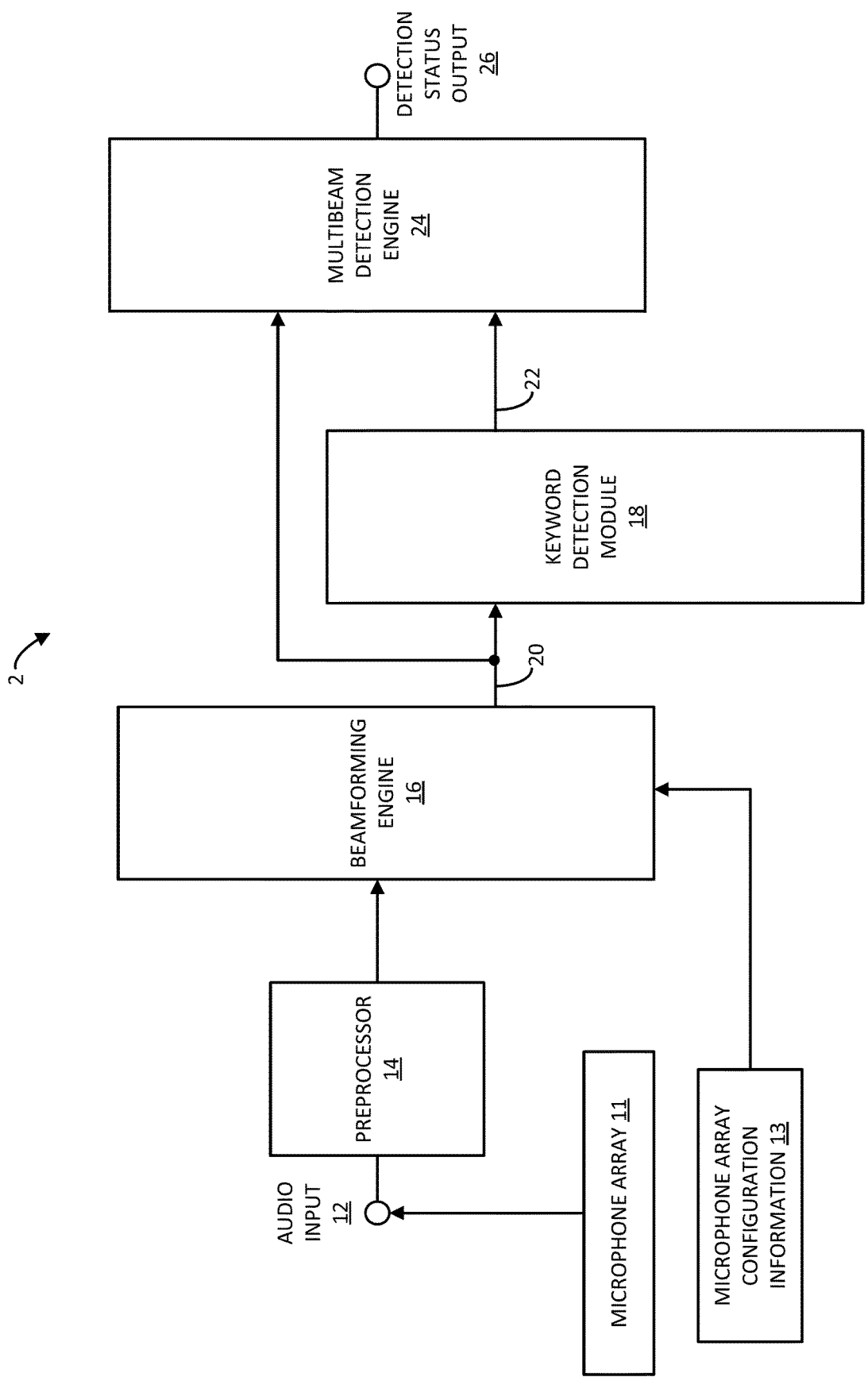
FIG. 2 depicts an example multibeam keyword detection system, in accordance with various embodiments.
Figure 3:
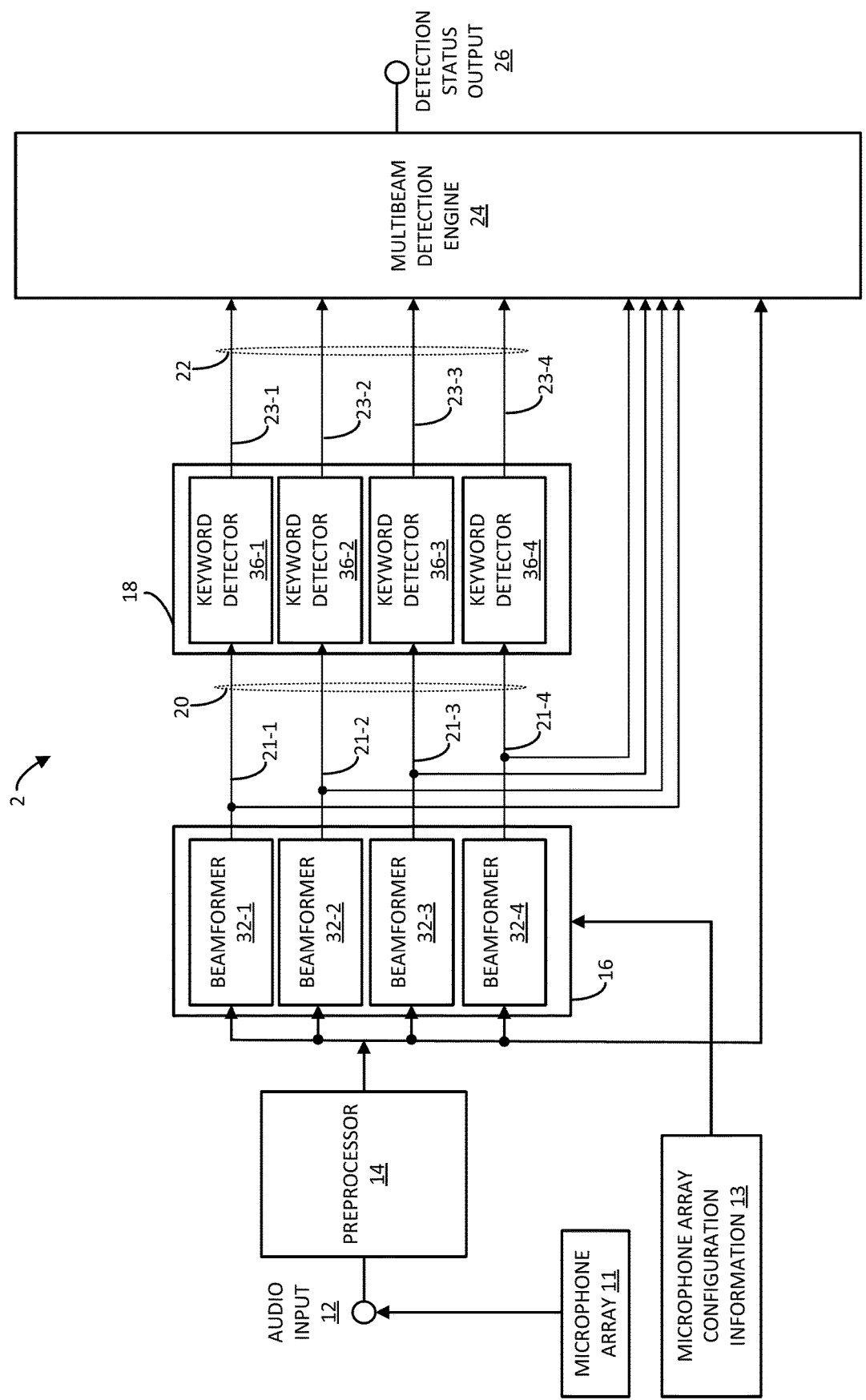
FIG. 3 depicts a detailed view of an example configuration of components of the multibeam keyword detection system of FIG. 2, in accordance with various embodiments.

In FIGS. 2 and 3, an example embodiment of a multibeam keyword detection system 2 is depicted. In various embodiments, a composite audio signal is received at an audio input 12. The composite audio signal may comprise audio signals from each microphone of a microphone array 11. Additionally, the composite audio signal may include different sounds, each sound having an angle of arrival, as computed or determined by the beamforming engine to be described further below.

In various embodiments, an optional preprocessor 14 is provided. The preprocessor 14 may comprise a common or additional processor and/or application configured to filter the composite audio signal. For example, in various embodiments, the preprocessor 14 comprises an acoustic echo canceler to at least partially cancel echoes, for example, linear echo(s), in one or more components of the composite audio signal prior to provision of the composite audio signal from the audio input 12 to other aspects of the system 2, such as to a beamforming engine 16.

The multibeam keyword detection system 2 includes a beamforming engine 16. The beamforming engine 16 may comprise a common or additional processor and/or application configured to divide the composite audio signal into component beam signals based on the desired number of beams and associated beam widths. Thus, the beamforming engine forms "beams" including all the sounds having a certain shared angle of arrival or having an angle of arrival within a certain shared range. The term "spatially partitioning" a "composite audio signal" is used herein to refer to this division of sounds into groups based on the angle of arrival of the sound so that groups of sounds have angles of arrival inside a particular range.

A spatial partition may be defined by a variety of different variables or other indicia recognizable by a computer processor. For example, a median angle and a range of angles of arrival relative to the median angle may define each spatial partition. In further instances, an upper and lower bounding angle measured relative to a fixed reference may define a spatial partition. Any other mechanism for measurement may be contemplated. A spatial partition may correspond to a single angle, or a spatial partition may correspond to range of angles. Consequently, a beamforming engine 16 may turn an omnidirectional or otherwise wider angle composite audio signal into multiple directional subset signals called spatial partitions.

In addition, the beamforming engine 16 may perform an initial keyword presence determination, which may be an initial detection of a keyword in a spatial partition (beam) and/or may perform an initial speech presence determination, which maybe an initial detector of whether a spatial partition (beam) does or does not include speech.

Beamforming engine 16 may include multiple beamformers, and by associating only a subset of potential angles of arrival with each different beamformer, the beamforming engine may divide sounds into spatial partitions so that some sounds are processed by one beamformer and other sounds are processed by another beamformer. Each beamformer of the multiple beamformers is associated with a subset of potential angles of arrival. Thus, the beamforming engine 16 is configured to spatially partition the composite audio signal and associates each spatial partition with a separate beamformer. Beamformers may be fixed in number and implemented in hardware. In further instances, beamformers are variable in number and logically instantiated by the beamforming engine 16, such as via digital signal processing techniques. The beamformers of the beamforming engine 16 receive microphone array configuration information 13 from a storage media such as a non-transient computer readable memory, the microphone array configuration information corresponding to the arrangement, number, and configuration of the microphones of the microphone array 11. This information may be preprogrammed or may be collected and stored during operation of the microphone array 11. This information permits the calculation by the beamforming engine 16 of the different spatial partitions based on the correlation of the angle of arrival data of each sound with the microphone array configuration information 13. This information may originate during a factory calibration of a device, and/or may be provided by a host subsystem 3 (FIG. 1) via interface 7 (FIG. 1) (e.g. using API or other software executed by host processor 5 for communicating configuration information with audio input subsystem 9). By knowing the arrangement, number, and configuration of microphones that provide the audio signals, a beamforming engine 16 may create spatial partitions of the surrounding environment using beamforming techniques well known to those skilled in the art.

In various embodiments, the beamforming engine 16 may include four beamformers. In further embodiments the beamforming engine 16 may include any number of beamformers as desired. The beamforming engine 16 may logically instantiate different numbers of beamformers at different times. An example embodiment of FIG. 3 shows a first beamformer 32-1, a second beamformer 32-2, a third beamformer 32-3, and a fourth beamformer 32-4. Each beamformer is associated with a subset of potential angles of arrival. Stated differently, each beamformer is associated with a different spatial partition of the acoustic environment and generates a different beam signal from the composite audio signal. For example, the first beamformer 32-1 may be associated with a spatial partition of 0-90 degrees, the second beamformer 32-1 may be associated with a spatial partition of 90-180 degrees, the third beamformer 32-3 may be associated with a spatial partition of 180-270 degrees, and the fourth beamformer 32-4 may be associated with a spatial partition of 270-360 degrees. In various embodiments, a small null area may separate each spatial partition. For example, a narrow window of 10 degrees or 5 degrees or 3 degrees or 1 degree or any amount at the edge of each spatial window may be ignored. For instance, the first beamformer 32-1 may be associated with a spatial partition of 1-89 degrees, the second beamformer 32-1 may be associated with a spatial partition of 91-179 degrees, the third beamformer 32-3 may be associated with a spatial partition of 181-269 degrees, and the fourth beamformer 32-4 may be associated with a spatial partition of 271-359 degrees. Any other configuration may be selected as desired, including partially overlapping spatial partitions. For example, an overlap window of 5 degrees or 3 degrees or 1 degree or any amount at the edge of each spatial window may be included. For instance, the first beamformer 32-1 may be associated with a spatial partition of 355-95 degrees, the second beamformer 32-1 may be associated with a spatial partition of 85-185 degrees, the third beamformer 32-3 may be associated with a spatial partition of 180-275 degrees, and the fourth beamformer 32-4 may be associated with a spatial partition of 270-5 degrees.

The multibeam keyword detection system 2 may also have a keyword detection module 18. The keyword detection module 18 may comprise a common or additional processor and/or application configured to determine whether a keyword is present in a signal. For instance, the beamforming engine 16 may provide a beamforming engine output data set 20 to the keyword detection module 18. This beamforming engine output data set 20 may include both the sounds in the acoustic environment and their associated angles of arrival. In addition, the beamforming engine output data set 20 may include an initial keyword presence determination, which may be an initial detection of a keyword in a spatial partition (beam) and/or may include an initial speech presence determination, which maybe an initial detector of whether a spatial partition (beam) does or does not include speech. Stated differently, the beamforming engine output data set may comprise a plurality of beam signals, each of which has at least one angle of arrival. Stated yet another way, the beamforming engine output data set may comprise a plurality of spatial partitions. The sounds and associated angles of arrival can be tagged, structured, or otherwise associated with which spatial partition (e.g., median angle and range of arrival angles) they belong to. This combination of angle of arrival data, sound, and spatial partition makes up the different beams having different angles of arrival that collectively make up the beamforming engine output data set 20. The keyword detection module 18 may receive the beamforming engine output data set 20. Stated differently, the keyword detection module 18 may receive all or part of the plurality of sound components of the composite audio signal and may analyze one or more samples thereof to determine whether the contents of that component correspond to sounds forming a keyword. The beamforming engine output data set 20 may contain contributions from multiple beamformers of the beamforming engine 16. For example, the beamforming engine output data set 20 may include a first beamforming engine output data subset (called a first beam signal 21-1) from the first beamformer 32-1, a second beamforming engine output data subset (called a second beam signal 21-2) from the second beamformer 32-2, a third beamforming engine output data subset (called a third beam signal 21-3) from the third beamformer 32-3, and a fourth beamforming engine output data subset (called a fourth beam signal 21-4) from the fourth beamformer 32-4.

The spatially partitioned composite audio signal may thus be divided into beam signals by the beamforming engine, each beam comprising sounds having angles of arrival inside a different range or inside ranges centered on different median values. The keyword detector array may receive the spatially partitioned composite audio signal and may check one or more of the portions for a keyword being present. Specifically, the keyword detector array may process one or more of the sounds within one or more of the portions and by machine processing, determine whether the sounds correspond to a keyword. A keyword may comprise a spoken phrase.

As introduced above, the keyword detection module 18 receives the beamforming engine output data set 20 and determines that a keyword is present in the audio input 12 based on the sounds in each beam of the beamforming engine output data set 20. This determination may be made by digital signal processing and/or other techniques that are known to those skilled in the art.

Moreover, because the beamforming engine 16 spatially partitions the composite audio signal and each spatial partition is processed by a separate beamformer generating a separate beamforming engine output data subset (e.g., a beam signal having an associated angle of arrival or range of angles of arrival), the keyword detection module 18 may also include multiple keyword detectors, each associated with a separate beamformer and operating responsive to a separate beam signal. For example, the keyword detection module 18 may include a first keyword detector 36-1 associated with the first beamformer 32-1 and operating responsive to the first beam signal 21-1. Similarly, the keyword detection module 18 may include a second keyword detector 36-2 associated with the second beamformer 32-2 and operating responsive to the second beam signal 21-2, a third keyword detector 36-3 associated with the third beamformer 32-3 and operating responsive to the third beam signal 21-3, and a fourth keyword detector 36-4 associated with the fourth beamformer 32-4 and operating responsive to the fourth beam signal 21-4. Each keyword detector 36 may be implemented to detect a predetermined keyword in an audio signal using any number of techniques well known to those skilled in the art.

The keyword detection module 18 also provides an indication to other system components of this keyword detection by transmitting keyword presence data 22 to the other system components. For example, the keyword detection module 18 provides this keyword presence data 22 to a multibeam detection engine 24 (discussed below). This keyword presence data 22 may be one or more transition of a logic level between a high-state, a low state, and/or a high-impedance state. This keyword presence data 22 may be one or more analog waveforms, or a sequence of bits or bytes, or any other mechanism of communication between electronic devices. The keyword presence data 22 may comprise a simple binary indication of the presence of a keyword or a numeric value indicating a probability that the keyword is present and/or a probability of a false alarm (e.g., a confidence that a present keyword has energy spectral composition and temporal features of an actual human voice). In further embodiments, keyword presence data 22 may refer to one or more interrupts triggered by the keyword detection module 18 when a keyword is detected. The interrupt may be caught by the multibeam detection engine 24 which may take responsive action. This indication may also be one or more flag changes in a register which the other modules can monitor to be notified of the detection. Finally, the keyword presence data 22 may include multiple keyword presences data subsets because the keyword detection module 18 may include multiple keyword detectors.

For example, in one non-limiting example illustrated in FIG. 3, the keyword detection module 18 includes a first keyword detector 36-1, second keyword detector 36-2, third keyword detector 36-3 and fourth keyword detector 36-4. Consequently, the keyword presence data 22 also contains contributions from the multiple keyword detectors of the keyword detection module 18. For example, the keyword presence data 22 may include a first keyword presence data subset 23-1 from the first keyword detector 36-1 that indicates whether a keyword is present in the first beam signal 21-1, a second keyword presence data subset 23-2 from the second keyword detector 36-2 that indicates whether a keyword is present in the second beam signal 21-2, a third keyword presence data subset 23-3 from the third keyword detector 36-3 that indicates whether a keyword is present in the third beam signal 21-3, and a fourth keyword presence data subset 23-4 from the fourth keyword detector 36-4 that indicates whether a keyword is present in the fourth beam signal 21-4.

The multibeam keyword detection system 2 may also have a multibeam detection engine 24. The multibeam detection engine 24 comprises a common or additional processor and/or application configured to provide a detection status indication on a detection status output 26 in response to the keyword presence data 22 and, optionally, the composite audio signal provided by the preprocessor 14 to the beamforming engine 16 and/or the beamforming engine output data set 20. A detection status indication comprises an indication that a keyword has been detected and the detected is not a false alarm. Stated differently, the detection status indication comprises an indication that a valid keyword has been detected. The detection status indication may also include information about the detected keyword, such as the angle of arrival data which may be extracted from the composite audio signal, or the spatial partition associated with the detected keyword. The detection status output 26 may include an indication that a keyword has been detected and an angle of arrival for the sound corresponding to the detected keyword. A person having ordinary skill in the art will appreciate that this detection status output 26 may be utilized by other systems, methods, and/or devices. The multibeam detection engine 24, in various embodiments, receives the keyword presence data 22 from each keyword detector of the keyword detection module 18 and performs "OR" logic to indicate keyword detection within any of the beams.

In further instances, the multibeam detection engine 24 gates certain beams on and off, for instance, ignoring beams associated with noise, and focusing only on beam(s) associated with a keyword detection event so that subsequent false detection events near in time to a keyword detection event are ameliorated. As used herein, to gate a beam on or off means to refrain from indicating keyword detection based on data associated with that beam (stated differently, the beam is discarded). Furthermore, the multibeam detection engine 24 may receive the composite audio signal and/or data representative of echoes from the preprocessor 14 and gate certain beams on and off based on a beam having sounds that are determined by the preprocessor 14 to be echoes according to known detection algorithms implemented in known linear and/or non-linear echo cancelers, thereby enhancing echo cancelation. For instance, the preprocessor 14 may provide data to the multibeam detection engine 24 indicating presence of echo(s) so that the multibeam detection engine 24 may gate affected beams off.

The multibeam detection engine 24 may also utilize combinations of inputs to facilitate the amelioration of false keyword detections. For example, the multibeam detection engine 24 is configured to receive the keyword presence data 22 indicating whether a keyword is detected and also to receive the angle of arrival data, the spatial partition data contained in the beamforming engine output data set 20 and/or in the composite audio signal, and the initial keyword presence determination which is also contained in the beamforming engine output data set 20. In instances wherein the keyword detection is a false alarm of from one keyword detector within the keyword detection module 18, it may be likely that other keyword detectors will also produce a false alarm. Thus, the multibeam detection engine 24 inhibits triggering of a detection status on output 26 for a period of time after a false alarm. In addition, the multibeam detection engine 24 may inhibit triggering of a detection status indication on output 26 for a period of time after a valid keyword detection in order to inhibit duplicative keyword detection events. Thus, the detection status output 26 may further be gated wherein a first keyword detection event by a first keyword detector triggers the multibeam detection engine 24 to inhibit subsequent detection by the same keyword detector and/or other keyword detectors within a temporally proximate period of time. In various embodiments a "temporally proximate period of time" may comprise thirty frames, which may be 0.25 seconds, though different periods may be contemplated. Thus, it may be said that the multibeam detection engine 24 implements detection hysteresis, meaning that keyword detection events are rate limited such that any keyword detection inhibits subsequent keyword detection for a set period of time, such as the temporally proximate period of time mentioned above. In this manner, false alarm rate may be reduced and race states associated with multiple valid keyword detections in rapid sequence may be reduced. Stated yet another way, the multibeam detection engine 24 inhibits any state change of the detection status output 26 that would otherwise be triggered by a keyword detector within the keyword detection module 18 simultaneously with or near-in-time to another keyword detection by another keyword detector. In this manner, race states may be avoided such as when a speaker stands near the edge of the spatial partition of two different beamformers in the beamforming engine 16. Such detection hysteresis may be implemented in addition to further techniques discussed herein.

Moreover, in various embodiments, the multibeam detection engine 24 may further compare multiple keyword presence data subsets from multiple keyword detectors. For example, in various embodiments, the spatial partitions associated with each keyword detector overlap. Thus, a single spoken keyword by a single speaker may trigger multiple keyword detectors. In various embodiments, the multibeam detection engine may further gate the detection status output 26 when a first keyword detection event by a first keyword detector fails to be accompanied by a second keyword detection event by a second keyword detector.

Thus, it may be said that the multibeam detection engine 24 implements parallel detection voting, meaning that a first threshold number of keyword detectors (for example, two) must agree in an indication of a keyword detection event otherwise keyword detection is inhibited and the detection status output 26 is not triggered to indicate a keyword detection event.

Furthermore, in various embodiments, the multibeam detection engine 24 may further compare one or more keyword presence data subset at a first instant in time to a keyword presence data subset at a second instance in time. For example, in various embodiments, a keyword presence data subset represents data at a specific window of time. Because a keyword presence data subset indicating a keyword detection event may be associated with a window of time that is afflicted with transient noise or other artifacts that may inadvertently indicate keyword detection, the multibeam detection engine 24 may implement temporal detection voting, meaning that an indication of a keyword detection event must persist for a first threshold duration of time. The first threshold duration of time may be a period of time that would be practically expected in connection with human speech. For example, a keyword may require several seconds for a human to speak the entire keyword. The keyword detection event must be consistent with this duration of speech. For instance, speech presence data from the beamforming engine may be analyzed upon a possible keyword detection event and the duration of time that speech was present in connection with the keyword detection event may be measured to determine if the duration of time is at least equal to the first threshold duration of time. In one example, a keyword detection event for the word "Activate" that is only associated with a millisecond of detected speech is a false detection. Thus, the detection status output 26 is not triggered to indicate a keyword detection event.

Moreover, because the multibeam detection engine 24 receives the beamforming engine output data set 20 and, optionally, the composite audio signal, the multibeam detection engine 24 is further able to implement a machine learning technique which ingests angle of arrival data, waveform, spatial partition, as well as ingesting keyword presence data 22, and generate adaptive rules and heuristics for distinguishing false alarm events from true keyword detections by known machine learning techniques. This combined set of data from the beamforming engine output data set 20, the keyword presence data 22, and optionally, the composite audio signal, contains patterns, relationships, and dependencies within the data which may be ascertained by machine learning so that the multibeam detection engine 24 provides adaptive improvements to the accuracy and precision of keyword detections. Thus one may say that the multibeam detection engine 24 ingests data representative of the acoustic environment and inhibits indication of keyword presence responsive to false alarms. This acoustic environment is different when an activation is false and the differences may be identified, measured, and cataloged by the multibeam detection engine 24 over time.

In yet further instances, the multibeam detection engine 24 may facilitate tracking of speakers within an acoustic environment. For instance, a user may speak a keyword and then after speaking the keyword may speak further voice commands. The multibeam detection engine 24 may facilitate selectively ignoring the spatial partitions that do not include the speaker so that intelligibility of the further voice commands is improved. For instance, the audio input may receive a second composite audio signal comprising a second plurality of sound components each having a second angle of arrival. This is the voice command that arrives after the keyword. The beamforming engine may determine the second angle of arrival associated with each sound of the second plurality of sound components via same or similar techniques as with the first plurality of sound components. Similarly, each beamformer of the multiple beamformers may be associated with the subset of potential angles of arrival as before. Notably however, the multi-beam detection engine may discard a portion of the second plurality of sound components having a second angle of arrival not within the subset of potential angles of arrival for the beamformer associated with the keyword. In other words, the keyword detectors associated with the other spatial partitions may generate outputs, but these outputs are ignored, and more generally, the other spatial partitions are ignored, while the further voice commands are being received.

Moreover, in this further instance, the beamforming engine may also turn off the ignored beamformers during this period, further improving processor load and power consumption. Thus, the multibeam detection engine 24 may direct the beamforming engine to deactivate one or more beamformers. Thus, a fewer number of beamformers are active and the subset of potential angles of arrival comprises fewer potential angles for the second composite audio signal as the beamforming engine reduces the number of beamformers that are active, at the direction of the multibeam detection engine.

In yet further instances, the multibeam detection engine 24 may direct the beamforming engine to turn on or turn off different beamformers adaptively as the angle of arrival of the sound waves associated with the speech of the user changes. For instance, a user may move while speaking, transitioning from within one spatial partition, to another. Because the multibeam detection engine 24 receives the beamforming engine output data set 20 and the keyword presence data 22, the multibeam detection engine 24 may track these changes over time and activate and deactivate different beamformers so that the spatial partition associated with the moving user is active, while other spatial partitions are not. Thus, the multibeam detection engine changes the portion of the plurality of sound components of the composite audio signal that are discarded in response to the angle of arrival changing as the speaker moves.

Figure 4:
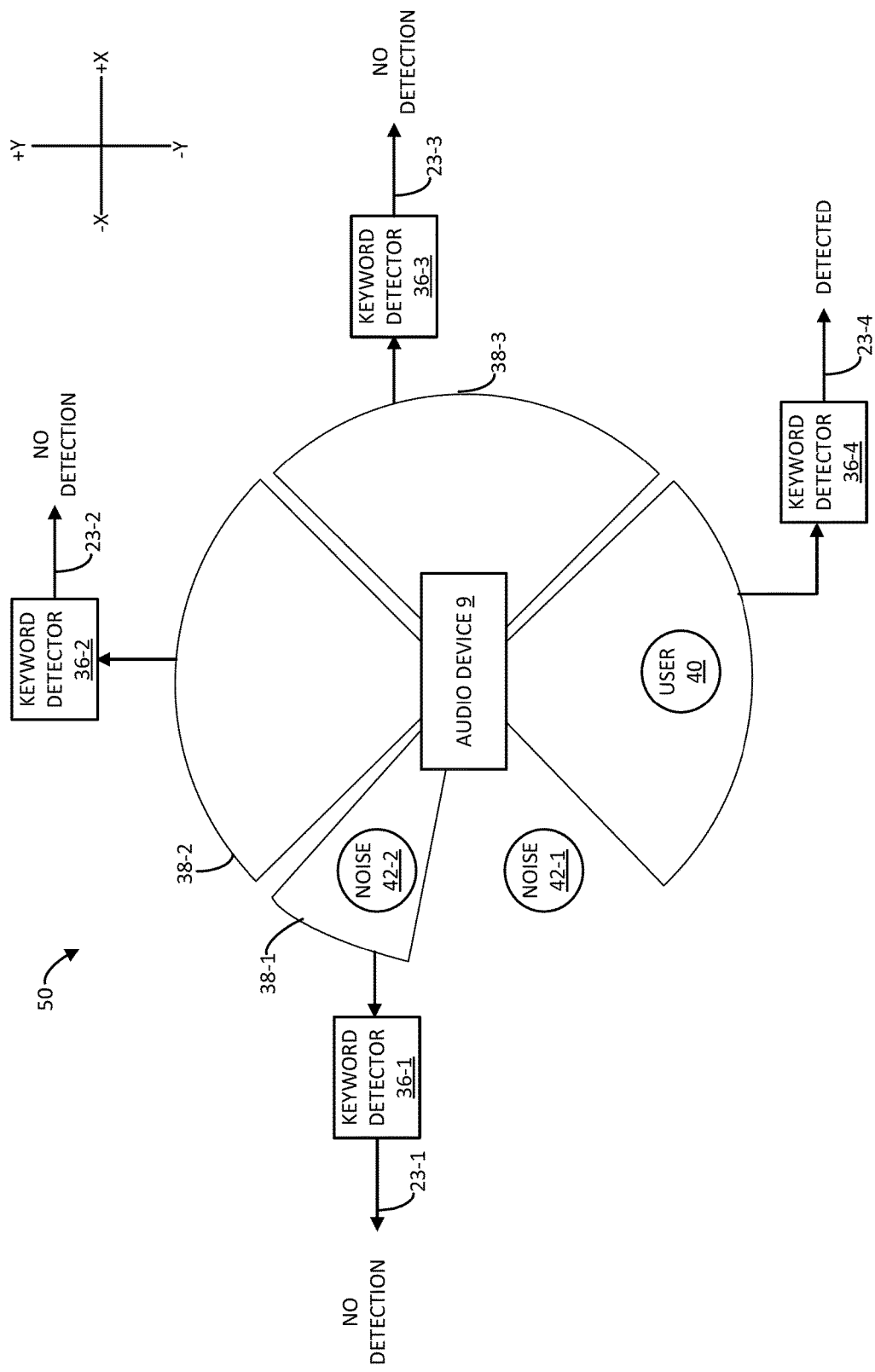
FIG. 4 represents an example use case of the multibeam keyword detection system of FIGS. 2 and 3 implemented in a device of FIG. 1, in accordance with various embodiments.

With combined reference to FIGS. 1-3 and additional reference to FIG. 4, an example use case of a multibeam keyword detection system 2 is shown. An audio input subsystem 9 is provided incorporating a multibeam keyword detection system 2. The audio input subsystem 9 is operating within an acoustic environment 50. An acoustic environment 50 may comprise a user 40 who may be speaking to issue a keyword and/or other voice commands, a noise source which may be generating sounds, and a physical space which may be occupied by one or more of the user 40, various noise sources, and the audio input subsystem 9. The acoustic environment 50 depicted in FIG. 4 includes an audio input subsystem 9 incorporating a multibeam keyword detection system 2, a first noise source 42-1, a second noise source 42-2, and a user 40.

The beamforming engine 16 of the multibeam keyword detection system 2 spatially partitions the acoustic environment 50 into different subsets of potential angles of arrival. FIG. 4 shows four spatial partitions each with a median angle spaced about 90 degrees from the nearest adjacent spatial partition. The spatial partitions are shown as ovals, but may also be conceptualized as cones having a median angle, and being bounded on the sides by a minimum angle and a maximum angle. Notably, the spatial partitions may be adjacent but spaced apart or may be touching or even overlapping. In the example, a first spatial partition 38-1 extends in a negative-X direction, a second spatial partition 38-2 extends in a positive-Y direction, a third spatial partition 38-3 extends in a positive-X direction, and a fourth spatial partition 38-4 extends in a negative-Y direction.

The first spatial partition 38-1 is formed by a first beamformer 32-1 of the beamforming engine 16 and provides a first beamforming engine output data subset (first beam signal 21-1) of the beamforming engine output data set 20 to the first keyword detector 36-1 of the keyword detection module 18. The second spatial partition 38-2 is formed by a second beamformer 32-2 of the beamforming engine 16 and provides a second beamforming engine output data subset (second beam signal 21-2) of the beamforming engine output data set 20 to the second keyword detector 36-2 of the keyword detection module 18. The third spatial partition 38-3 is formed by a third beamformer 32-3 of the beamforming engine 16 and provides a third beamforming engine output data subset (third beam signal 21-3) of the beamforming engine output data set 20 to the third keyword detector 36-3 of the keyword detection module 18. The fourth spatial partition 38-4 is formed by a fourth beamformer 32-4 of the beamforming engine 16 and provides a fourth beamforming engine output data subset (fourth beam signal 21-4) of the beamforming engine output data set 20 to the fourth keyword detector 36-4 of the keyword detection module 18.

A first noise source 42-1 is positioned between the first spatial partition 38-1 and the fourth spatial partition 38-4 and does not reside in either spatial partition. This illustrates one advantage of the multibeam keyword detection system 2. Specifically, noise sources may be isolated and ignored via beamforming of the spatial partitions to place the first noise source 42-1 outside of the spatial partitions feeding the keyword detectors. Thus, one may say that the first noise source 42-1 is sonically decoupled from the keyword detection module 18.

A second noise source 42-2 lies within the first spatial partition 38-1. Consequently, the noise generated by the second noise source 42-2 contributes to the sounds of the composite audio signal that are associated with the first beamformer 32-1 and thus the first keyword detector 36-1. The first beamforming engine output data subset (first beam signal 21-1) includes both a waveform at least partially representative of the sounds made by the second noise source 42-2 as well as an angle of arrival for the waveform at least partially representative of the sounds made by the second noise source 42-2. While only two noise sources are shown in FIG. 4, one may appreciate that may noise sources may be present, including multiple noise sources in one or more spatial partition, including a spatial partition shared by the user 40.

A user 40 is positioned within the fourth spatial partition 38-4. The spoken keywords spoken by the user 40 contribute to the sounds of the composite audio signal that are associated with the fourth beamformer 32-4 and thus the fourth keyword detector 36-4. The fourth beamforming engine output data subset (fourth beam signal 21-4) includes both a waveform at least partially representative of the sounds made by the user 40 as well as an angle of arrival for the waveform at least partially representative of the keyword spoken by the user 40. This fourth beamforming engine output data subset (fourth beam signal 21-4) is provided to the fourth keyword detector 36-4 which generates a fourth keyword presence data subset 23-4 representative of a keyword being present.

Notably, the first noise source 42-1 and the second noise source 42-2 are sonically decoupled from the fourth keyword detector 36-4 in the depicted scenario. Because the fourth spatial partition 38-4 neither includes the first noise source 42-1 nor the second noise source 42-2, the deleterious effects of unwanted noise are ameliorated for the fourth beamforming engine output data subset (fourth beam signal 21-4). Consequently, the fourth keyword detector 36-4 more precisely and accurately detects the presence of the keyword and the quality and reliability of the fourth keyword presence data subset 23-4 is enhanced. The second noise source 42-2 is sonically coupled to the first keyword detector 36-1 but not the fourth keyword detector 36-4. Thus, by isolating the deleterious effect of noise on the signal-to-noise ratio of beamforming engine 16 output data subsets (beams), the performance of the keyword detectors is enhanced.

Consequently, the first keyword presence data subset 23-1 indicates no keyword presence, the second keyword presence data subset 23-2 indicates no keyword presence, the third keyword presence data subset 23-3 indicates no keyword presence, and the fourth keyword presence data subset 23-4 does indicate keyword presence. The multibeam detection engine 24 receives these subsets and indicates keyword presence on the detection status output 26 responsive to the user 40, as detected by the fourth keyword detector 36-4.

Moreover, the multibeam detection engine 24 may further discard the portions of the composite audio signal that are associated with the first spatial partition 38-1, the second spatial partition 38-2 and the third spatial partition 38-3. In the future, the user 40 may speak an additional voice command following the keyword. Because the multibeam detection engine 24 now has data indicating that the user 40 is in the fourth spatial partition 38-4, the multibeam detection engine 24 may discard a portion of components of the composite audio signal associated with the first spatial partition 38-1, the second spatial partition 38-2, and the third spatial partition 38-4, also enhancing the accuracy of machine processing of the user's speech because the second noise source 42-2 remains sonically decoupled from the fourth keyword detector 36-4 and potential future noise sources appearing in locations other than the fourth spatial partition 38-4 are also sonically decoupled from the fourth keyword detector 36-4 because these spatial partitions are discarded. Alternatively, the multibeam detection engine 24 may direct the beamforming engine 16 and or keyword detection module 18 to turn off beamformers or keyword detectors in these unwanted spatial partitions, thereby reducing processor load and saving power. Furthermore, as a speaker moves around an acoustic environment, the beams may be adjusted to have different angular widths, to be oriented in different directions, and/or different beamformers or keyword detectors may be turned on and turned off, so that the spatial partitions are reshaped, and sonic decoupling of unwanted noise maintained as the speaker moves.

Figure 5:
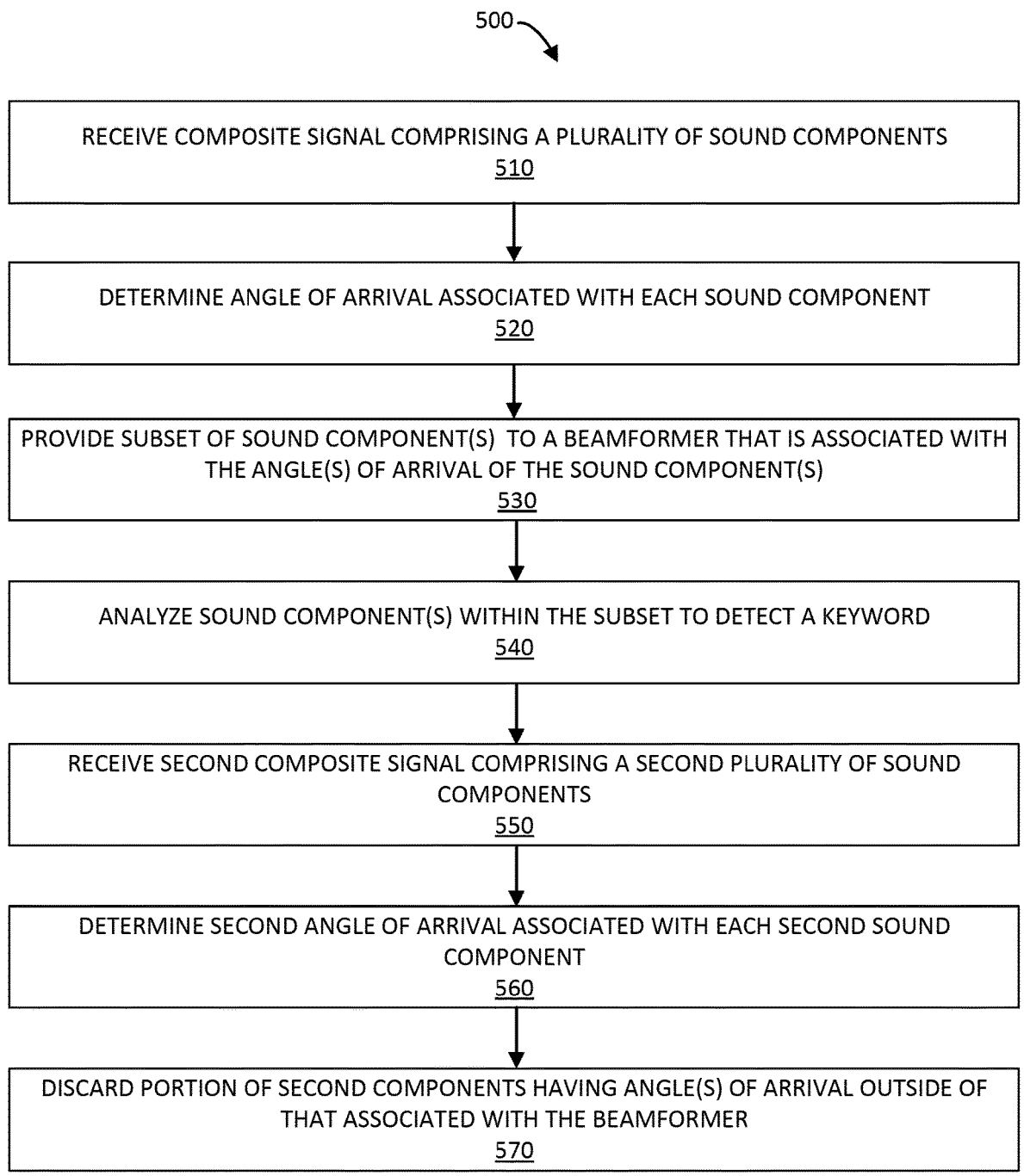
FIG. 5 depicts a method of multibeam keyword detection, in accordance with various embodiments.

Referring now to FIG. 5, a method of multibeam keyword detection 500 is provided. The method may include various blocks which are illustrated diagrammatically in a sequence. However, in practical embodiments, the various blocks and the functions associated with the various blocks may occur in parallel, or in overlapping time relation, and/or in different orders.

The method may include receiving a composite signal from a microphone array (block 510). The method may further include determining an angle of arrival associated with each sound component of the composite signal (block 520). Subset(s) of the sound component(s) are provided to beamformers. Each sound component is provided to a beamformer that is associated with the angle of arrival of that sound component. In various embodiments, multiple beamformers are implemented and each are provided with a different beam angle or subset (block 530). The method may include analyzing the sound components to detect a keyword therein (block 540). Because each beamformer is associated with different angles of arrival, the sound component containing the keyword will be associated with a beamformer. The method may continue with the receipt of a second composite signal comprising a second plurality of sound components (block 550). The method may include further determining an angle of arrival associated with each sound component of the second composite signal (block 560). Finally, the method includes discarding a portion of the second components having angles of arrival outside of that associated with the beamformer also associated with the sound component having the keyword (block 570).

As used herein, the terms "approximately" generally mean plus or minus 10% of the stated value. For example, approximately 0.5 would include 0.45 and 0.55, approximately 10 would include 9 to 11, and approximately 1000 would include 900 to 1100.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The present technology is described above with reference to example embodiments. Therefore, other variations upon the example embodiments are intended to be covered by the present disclosure. As used herein, the singular terms "a," "an," and "the" may include plural references unless the context clearly dictates otherwise. Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

The invention claimed is:

1. A system for keyword detection comprising:
   an audio input configured to receive a composite audio signal from a microphone array;
   a beamforming engine comprising a plurality of beamformers coupled to receive the composite audio signal and configured to form a plurality of beam signals from the composite audio signal, each of the plurality of beam signals having an associated beam angle and comprising audio data corresponding to sounds captured by the microphone array within a range of angles of arrival with respect to the beam angle;

a keyword detection module having a plurality of keyword detectors, each keyword detector configured to receive a respective one of the plurality of beam signals and to detect a keyword; and a multibeam detection engine configured to receive, from each of the plurality of keyword detectors, keyword presence data indicating whether or not the keyword detector has detected a keyword and configured to produce a keyword detection output indicating whether or not a keyword has been detected by one or more of the keyword detectors based on the received keyword presence data.

2. The system for keyword detection of claim 1, further comprising a preprocessor coupled between the audio input and the beamforming engine and configured to filter the composite audio signal.

3. The system for keyword detection of claim 2, wherein the preprocessor comprises an acoustic echo canceler to at least partially cancel echoes in the composite audio signal.

4. The system for keyword detection of claim 1, wherein when the multibeam detection engine produces the keyword detection output indicating that the keyword has been detected in response to a first keyword detector detecting the keyword, the multibeam detection engine is further configured to inhibit a duplicate production of the keyword detection output in response to a second keyword detector also detecting the keyword within a temporally proximate period of time following the first keyword detector.

5. The system for multibeam keyword detection of claim 1, further comprising a memory that stores configuration information of the microphone array, wherein the beamforming engine is configured to access the memory to produce the plurality of beam signals.

6. The system for multibeam keyword detection of claim 1, wherein the multibeam detection engine is configured to cause the keyword detection output to indicate that the keyword has been detected if the keyword presence data of any of the keyword detectors indicates that the keyword has been detected.

7. The system for multibeam keyword detection of claim 1, wherein the keyword presence data includes false alarm data comprising a probability of a false alarm, and wherein the multibeam detection engine is configured to produce the keyword detection output using the false alarm data.

8. The system for multibeam keyword detection of claim 7, wherein the multibeam detection engine is configured to cause the keyword detection output to indicate that the keyword has not been detected if the false alarm data of any of the keyword detectors indicates the probability of false alarm.

9. The system for multibeam keyword detection of claim 1, wherein the plurality of beamformers comprises four beamformers and wherein the range of angles of arrival associated with each beamformer of the plurality of beamformers is approximately 90 degrees in width.

10. The system for multibeam keyword detection of claim 1, wherein the plurality of beamformers comprises four beamformers and wherein the range of angles of arrival associated with at least one beamformer of the plurality of beamformers is variable.

11. The system for multibeam keyword detection of claim 1, wherein the plurality of beamformers comprises four beamformers and wherein the range of angles of arrival associated with at least one beamformer of the plurality of beamformers is variable and at least one further beamformer of the plurality of beamformers is non-variable.

12. The system for multibeam keyword detection of claim 1, wherein the multibeam detection engine is further configured to provide an angle of arrival associated with a detected keyword.

13. A method of keyword detection comprising:
receiving from a microphone array a composite audio signal;
forming a plurality of beam signals from the composite audio signal, each of the plurality of beam signals having an associated beam angle and comprising audio data corresponding to sounds captured by the microphone array within a range of angles of arrival with respect to the beam angle;
processing, by a plurality of keyword detectors, the plurality of beam signals to detect a keyword in the plurality of beam signals, each keyword detector configured to receive a respective one of the plurality of beam signals and to detect a keyword; and
processing keyword presence data from all of the plurality of keyword detectors to produce a keyword detection output indicating whether or not a keyword has been detected based on the keyword presence data.

14. The method of keyword detection of claim 13, further comprising preprocessing the composite audio signal before forming the plurality of beam signals.

15. The method of keyword detection of claim 14, wherein preprocessing comprises performing acoustic echo cancelation to at least partially cancel echoes in the composite audio signal.

16. The method of multibeam keyword detection of claim 13, wherein forming the plurality of beam signals includes accessing configuration information of the microphone array.

17. The method of multibeam keyword detection of claim 13, wherein at least one beam signal of the plurality of beam signals has at least one of (i) a variable width and (ii) a variable direction.

18. The method of multibeam keyword detection of claim 13, wherein processing the keyword presence data includes causing the keyword detection output to indicate that the keyword has been detected if the keyword presence data of any of the keyword detectors indicates that the keyword has been detected.

19. The method of multibeam keyword detection of claim 13, wherein the keyword presence data includes false alarm data, and wherein processing the keyword presence data includes causing the keyword detection output to indicate that the keyword has not been detected if the keyword presence data of any of the keyword detectors indicates a probability of a false alarm.

20. The method of multibeam keyword detection of claim 13, wherein processing the keyword presence data further includes providing an angle of arrival associated with a detected keyword.

* * * * *